(12) United States Patent
Okamura et al.

(10) Patent No.: US 10,061,809 B2
(45) Date of Patent: Aug. 28, 2018

(54) CONTROL DEVICE

(71) Applicant: OMRON CORPORATION, Kyoto (JP)

(72) Inventors: Kotaro Okamura, Kyoto (JP); Yoshihide Nishiyama, Kyoto (JP); Minoru Oka, Kyoto (JP); Masanori Ota, Kyoto (JP); Masaru Nakasaki, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 196 days.

(21) Appl. No.: 14/405,980

(22) PCT Filed: Jun. 21, 2013

(86) PCT No.: PCT/JP2013/067088
§ 371 (c)(1),
(2) Date: May 15, 2015

(87) PCT Pub. No.: WO2013/191275
PCT Pub. Date: Dec. 27, 2013

(65) Prior Publication Data
US 2015/0254305 A1    Sep. 10, 2015

(30) Foreign Application Priority Data
Jun. 22, 2012    (JP) .................................. 2012-141378

(51) Int. Cl.
*G06F 7/02* (2006.01)
*G06F 17/30* (2006.01)
(Continued)

(52) U.S. Cl.
CPC ..... *G06F 17/30507* (2013.01); *G05B 19/056* (2013.01); *G06F 17/30595* (2013.01);
(Continued)

(58) Field of Classification Search
CPC .... G05B 19/056; G05B 19/05; G05B 19/418; G05B 19/41835; G06F 17/30507; G06F 17/30595; G06F 17/30
See application file for complete search history.

(56) References Cited

U.S. PATENT DOCUMENTS 6,735,594 B1    5/2004    Zimowski et al.
7,467,018 B1    12/2008    Callaghan
(Continued)

FOREIGN PATENT DOCUMENTS

EP    1420315    5/2004
EP    1906287    4/2008
(Continued)

OTHER PUBLICATIONS

International Search Report in Application No. PCT/JP2013/067088, dated Sep. 17, 2013.
(Continued)

*Primary Examiner* — Bruce M Moser
(74) *Attorney, Agent, or Firm* — Greenblum & Bernstein, P.L.C.

(57) ABSTRACT

Provided is a technique enables programming, including that for database operations, without describing a SQL used to operate the database. A PLC (30) that can access a DBMS (22) stores a user program (38) and definition information (32), the user program (38) including a structure type of variable, the definition information (32) indicating a definition of the structure type. The sequence command program (34) sequentially executes instructions in the user program (38) and invokes a DB access process program (35) in order to access the DBMS (22). The DB access process program (35) reads the definition information (32) and, on the basis of the read definition information (32), generates a SQL statement to be used when access to the DBMS (22) is made by execution of the user program (38). The DB access
(Continued)

process program (35) executes the generated SQL statement by transmitting the SQL statement to the DB server (20).

12 Claims, 8 Drawing Sheets

(51) Int. Cl.
  *G05B 19/05* (2006.01)
  *G05B 19/418* (2006.01)
(52) U.S. Cl.
  CPC .............. *G05B 19/4186* (2013.01); *G05B 2219/31369* (2013.01); *Y02P 90/12* (2015.11); *Y02P 90/185* (2015.11)

(56) References Cited

U.S. PATENT DOCUMENTS

| | | | |
|---|---|---|---|
| 7,565,351 | B1 | 7/2009 | Callaghan |
| 8,205,005 | B2 | 6/2012 | Leseberg et al. |
| 2006/0026193 | A1* | 2/2006 | Hood ................ G05B 19/0426 |
| 2008/0082681 | A1 | 4/2008 | Leseberg et al. |
| 2008/0208365 | A1* | 8/2008 | Grgic ................ G05B 19/042 |
| | | | 700/2 |
| 2009/0037872 | A1* | 2/2009 | Schnabele .......... G05B 19/4183 |
| | | | 717/105 |
| 2014/0136570 | A1 | 5/2014 | Okamura et al. |

FOREIGN PATENT DOCUMENTS

| | | |
|---|---|---|
| JP | 2001-34513 | 2/2001 |
| JP | 2002-23812 | 1/2002 |
| JP | 2002-99561 | 4/2002 |
| JP | 2002-149652 | 5/2002 |
| JP | 2003-91530 | 3/2003 |
| JP | 2004-302849 | 10/2004 |
| JP | 2006-164090 | 6/2006 |
| JP | 2007-80286 | 3/2007 |
| JP | 2008-83872 | 4/2008 |
| JP | 2012-108642 | 6/2012 |

OTHER PUBLICATIONS

Extended European Search Report in EP 13807001.6, dated Oct. 6, 2015.

* cited by examiner

Fig. 5

| Database table | | | | |
|---|---|---|---|---|
| Production Table | | | | |
| Name (String) | Lot No (Int) | Success Count (Int) | Failed Count (Int) | ... |
| Product 1 | 100 | 49 | 1 | ... |
| ... | ... | ... | ... | ... |

Fig. 7

```
//Set ProductionTable data to Database

//Insert ProductionTable data to Database
NJtoDBFunc(DBHandle:=MyHandle ,
           Variable:=ProductionTable,
           Done=>InsertDone,
           Error=>InsertError);
. . . .
```

Fig. 8

```
INSERT INTO ProductionTable (Name, LotNo, SuccessCount, FailedCount) VALUE
('Product1', 100, 49, 1);
```

```
<table name = "PTBL", struct name = "ProductionTable">;
  <field name = "NAME", member = "name">;
  <field name = "LONM", member = "LotNo">;
  <field name = "SCCT", member = "SuccessCount">;
  <fiedl name = "FLCT", member = "FailedCount">;

...
```

CONTROL DEVICE

TECHNICAL FIELD

The present invention relates to programmable logic controllers (PLCs) or other control devices, and more particularly, to a technique for facilitating access to database systems.

BACKGROUND ART

PLCs or other control devices are used to control automatic machines in factories and the like. Such control devices successively read values from, for example, sensors through their I/O functions and hold the data.

A contemporary control device is connected to a database system and stores its retained data in this database system. This can facilitate the sharing of data among information processing devices connected to the database and the summarization, analysis and the like of various types of data collected. For example, Japanese Unexamined Patent Publication No. 2007-80286 (patent document 1 listed below) discloses a data acquisition device that can transmit I/O data held in a PLC to a host computer in real time.

PRIOR ART DOCUMENT

Patent Document

Patent Document 1: Japanese Unexamined Patent Publication No. 2007-80286

SUMMARY OF THE INVENTION

Problems to be Solved by the Invention

Engineers responsible for control programs for PLCs and other control devices are typically familiar with structures and other data structures for use in control programs. However, there are cases where they have difficulty in operating databases which involves describing SQL statements and are not, in fact, familiar with database operations. In general, engineers of host computer systems, including databases, have a larger amount of know-how about database operations.

The present invention aims to provide a technique that facilitates the programming, including that for database access, when engineers develop control programs for PLCs and other control devices.

Means for Solving the Problem

A control device according to an embodiment which can access a database system includes a memory, a generator and an execution unit. The memory stores a user program and definition information, the user program including a structure type of variable, the definition information indicating a definition of the structure type included in the user program. The generator reads the definition information and, on the basis of the read definition information, generates a SQL statement to be used when access to the database system is made by execution of the user program. The execution unit executes the generated SQL statement by transmitting the SQL statement to the database system.

It is preferable that the generator may generate the SQL statement by extracting a structure tag name and a member name indicated by a definition in the definition information which corresponds to the executed user program, and designate the extracted structure tag name and member name as a table name and a field name used to access the database system in accordance with a preset conversion rule.

It is preferable that the generator may generate the SQL statement including no value, from which a table name and a field name used to access the database system are identified, on the basis of the definition information. Moreover, it is preferable that the execution unit may execute the SQL statement by transmitting the SQL statement including no value to the database system in advance, extracting a value of a member in the structure type of variable in accordance with an instruction in the user program, and transmitting the extracted value to the database system.

It is preferable that the memory may store mapping information that provides a conversion rule for converting a definition of a structure tag name and a member name indicated by the definition information into a table name and a field name used to access the database system. Moreover, it is preferable that the generator may generate the SQL statement on the basis of the structure tag name and the member name indicated by the definition information and the conversion rule provided by the mapping information.

It is preferable that the generator may generate the SQL statement including no value on the basis of a table name and a field name indicated by the mapping information. Moreover, it is preferable that the execution unit may execute the SQL statement by transmitting the SQL statement including no value to the database system in advance, extracting a value of a member in the structure type of variable in accordance with an instruction in the user program, and transmitting the extracted value to the database system.

It is preferable that the memory may be configured to store mapping information that provides a conversion rule for converting a definition of a structure tag name and a member name indicated by the definition information into a table name and a field name used to access the database system. It is preferable that the user program may include an instruction for generating the mapping information on the basis of the definition information. It is preferable that the generator may generate the mapping information on the basis of the definition information by executing the instruction for generating the mapping information which is included in the user program, and generate the SQL statement on the basis of the structure tag name and the member name indicated by the definition information and the conversion rule provided by the generated mapping information.

Effect of the Invention

The embodiment described above enables engineers responsible for control programs for control devices to perform programming, including that for database access, by using structure types of data structures without consideration for SQL statements used to operate databases. Therefore, the programming is facilitated.

The foregoing or other objects, characteristics, aspects and advantages of the present invention will be more apparent from the following detailed description of the invention which should be understood in conjunction with the accompanying drawings.

BRIEF DESCRIPTION OF THE DRAWINGS

FIG. 5 is a view illustrating a database table 26.

FIG. 7 is a view showing an exemplary user program.

FIG. 8 is a view showing an exemplary SQL statement.

MODE FOR CARRYING OUT THE INVENTION

Figure 1:
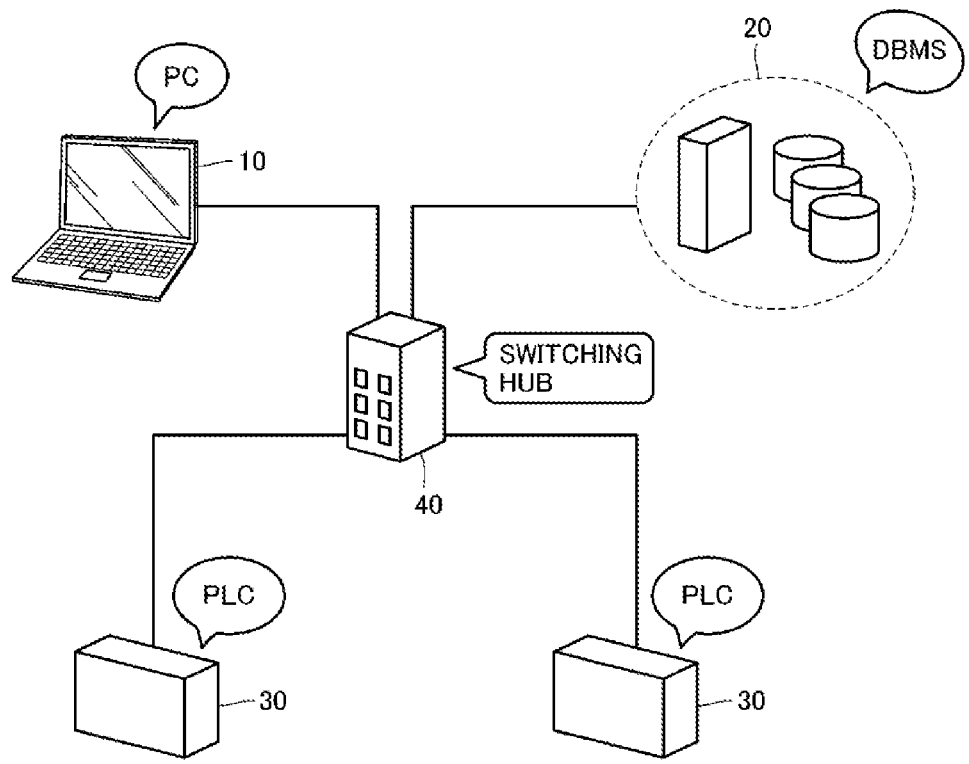
FIG. 1 is a view illustrating an overall configuration of a PLC system in this embodiment.

Some embodiments of the present invention will be described below with reference to the accompanying drawings. In the following description, the same reference characters will be given to identical parts. These parts also have the same names and functions. Accordingly, a detailed description of these will not be repeated.

1 Embodiment 1

1.1 Configuration of Embodiment 1

First, a system configuration of a control system according to this embodiment will be described. This embodiment will be described on the assumption that a typical example of a control device is a programmable controller (PLC) that controls a controlled object, such as a machine or facility. However, a control device according to the present invention is not limited to a PLC and applicable to various types of control devices.

FIG. 1 is a view illustrating an overall configuration of a PLC system in this embodiment.

First, the outline will be described. As illustrated in FIG. 1, the PLC system includes a PC (personal computer) 10, a DB (database) server 20, PLCs 30 and a switching hub 40. The PC 10 is an information processing device that enables the user to create a user program that will run in the PLCs 30. The DB server 20 is a server that functions as a DBMS (database management system) in order to manage a database.

The user program is created by the user of each PLC 30. For example, the user can create a program (source program) that includes an instruction of accessing the database by operating the PC 10. The PC 10 converts the format of the source program into an executable format in the PLCs 30 and then transmits the converted user program to one of the PLCs 30. The PLC 30 executes the user program, enabling access to the DB server 20 in accordance with an access instruction included in the user program.

The PLCs 30 are connected to the switching hub 40 and further to the PC 10 and the DB server 20 via the switching hub 40. Each PLC 30 receives, for example, a sensor output from the outside and stores the data. The stored data is transmitted from each PLC 30 to the DB server 20 by a process performed by a DB access process program 35 which will be described later. In the example illustrated in FIG. 1, an exemplary PLC system includes a plurality of PLCs 30, and respective primary configurations of the PLCs 30 are the same as each other. The switching hub 40 is connected to a plurality of apparatuses, including the PC 10, and forwards data transmitted and received from one apparatus to another.

Next, a detailed configuration of each apparatus will be described.

1.2 Detailed Configuration of Each Apparatus

Figure 2:
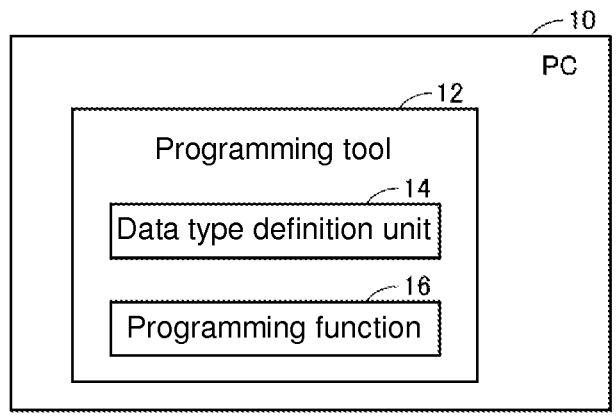
FIG. 2 is a block diagram of the function of a PC 10.

FIG. 2 is a block diagram of the function of the PC 10.

The PC 10 is a computer system (information processing device) that includes an MCU (micro control unit), a ROM (read only memory) and a RAM (random access memory). As illustrated in FIG. 2, the PC 10 fulfills the function of a programming tool 12. This programming tool 12 is a program that causes the PC 10 to provide the user with a function of creating the user program for operating each PLC 30. The programming tool 12 includes the functions of a data type definition unit 14 and a programming function 16. The user program that has been created in the programming tool 12 by the user is transmitted from the programming tool 12 to each PLC 30, and then is executed thereby.

The user program includes structure types of variables. The data type definition unit 14 is software that defines the structure types. Each structure type includes a tag name of a structure and one or more member names. The data type definition unit 14 defines the tag name and the member names of the structure and their data types. For example, in order to provide indices used for production management in a factory or the like, the data type definition unit 14 defines the structure type by setting the tag name of the structure as "Production Table" and the members of the structure as "Name," "LotNo," "SuccessCount" and "FailedCount." The "Name (string data type)" indicates the name of products to be manufactured. The "LotNo (integer data type)" is used to manage the lot number of the products. The "SuccessCount (integer data type)" indicates the number of products successfully manufactured. The "FailedCount (integer data type)" indicates the number of products defectively manufactured. The data type definition unit 14 defines the structure type in this manner and then generates definition information 32 that indicates this definition. The programming function 16 is software that helps the user to create programs. The PC 10 executes the above pieces of software, fulfilling the functions of the data type definition unit 14 and the programming function 16.

Figure 3:
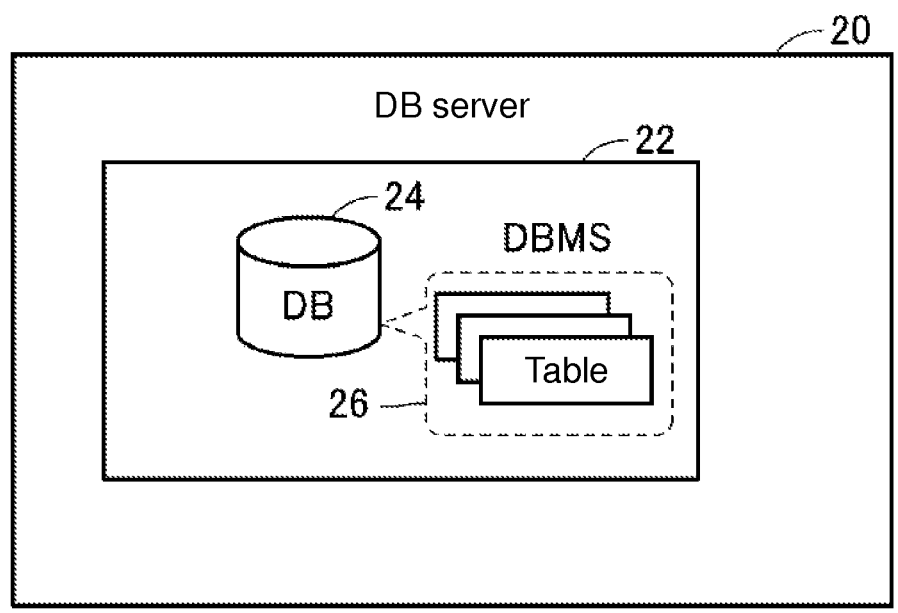
FIG. 3 is a block diagram of the function of a DB server 20; the DB server 20 is a computer system that includes a large-capacity storage device.

FIG. 3 is a block diagram of the function of the DB server 20. The DB server 20 is a computer system that includes a large-capacity storage device.

The DB server 20 fulfills the function of a DBMS 22 that manages the reading of data from a database and the writing of data into the database. The DBMS 22 includes a DB 24 functioning as the database; the DB 24 holds a plurality of database tables 26.

Figure 4:
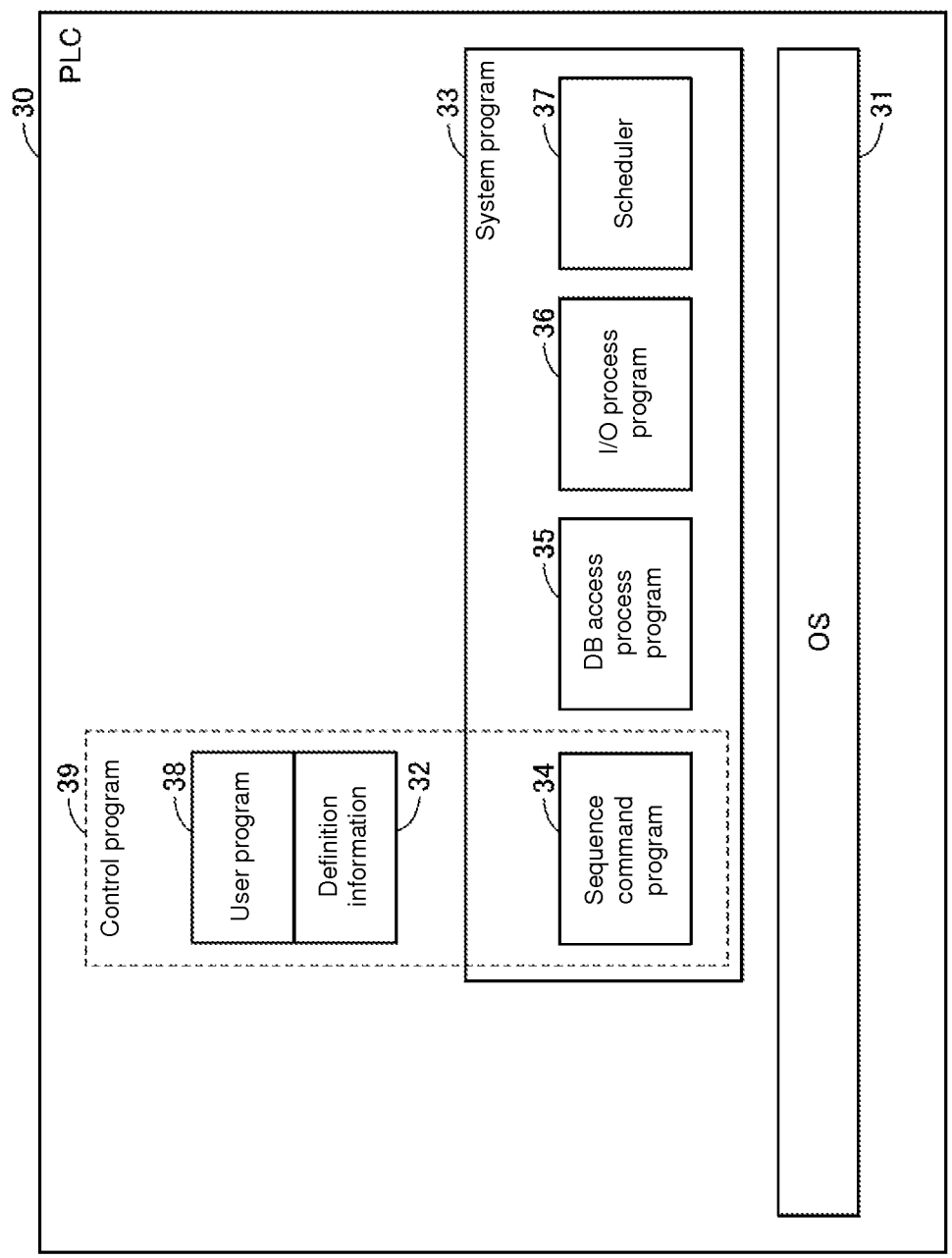
FIG. 4 is a block diagram of the function of a PLC 30.

FIG. 4 is a block diagram of the function of each PLC 30. Each PLC 30 is a computer system and executes the user program periodically. Each PLC 30 reads information from a memory region therein or writes information into the memory region, sequentially executing instructions indicated by the user program. Each PLC 30 is equipped with I/O functions; it receives data from the outside of the PLC 30, such as a sensor output, and stores the data. Then, each PLC 30 transmits the stored data to the DB server 20.

As illustrated in FIG. 4, the functional constituents of each PLC 30 are an OS 31, a system program 33, a user program 38 and the definition information 32. An OS 31 is designed in accordance with the computer architecture of each PLC 30 and provides a microprocessor (not illustrated) with a basic execution environment in which the system program 33 and the user program 38 are executed.

The system program 33 includes a software group that provides basic functions as the PLC 30. This system program 33 runs on the OS 31 and fulfills the function of controlling a ladder program and other programs. The system program 33 includes a sequence command program 34, the DB access process program 35, an I/O process program 36 and a scheduler 37. The sequence command program 34 sequentially executes instructions in the user program 38 while reading information from the memory region in the PLC 30 and writing information into the memory region. The DB access process program 35 is invoked in association with the execution of the user program 38 which is carried out by the sequence command program 34, and performs a process of causing the user program 38 to access the DB server 20, such as a process of generating SQL statements.

The I/O process program 36 controls data input to or output from the PLC 30 through the plurality of I/O functions of the PLC 30. The I/O functions are related to corresponding addresses of the memory. Data held in the memory corresponding to each I/O function is periodically replaced with data from the outside of the PLC 30 in one batch. The scheduler 37 controls the execution of the sequence command program 34, the DB access process program 35 and the I/O process program 36.

The user program 38 is created in the PC 10 by the user and held in the memory of the PLC 30. As illustrated in FIG. 4, both the user program 38 and the sequence command program 34 constitute a control program 39. Specifically, the sequence command program 34 reads the user program 38 and then sequentially executes instructions, causing the PLC 30 to perform a control operation according to a user's request.

The definition information 32 is information that indicates the definitions of the structure types of variables included in the user program 38, and defines the tag name of the structure, the member names included in the structure and their data types.

2 Data

Next, the data used in this embodiment will be described.

Figure 5:
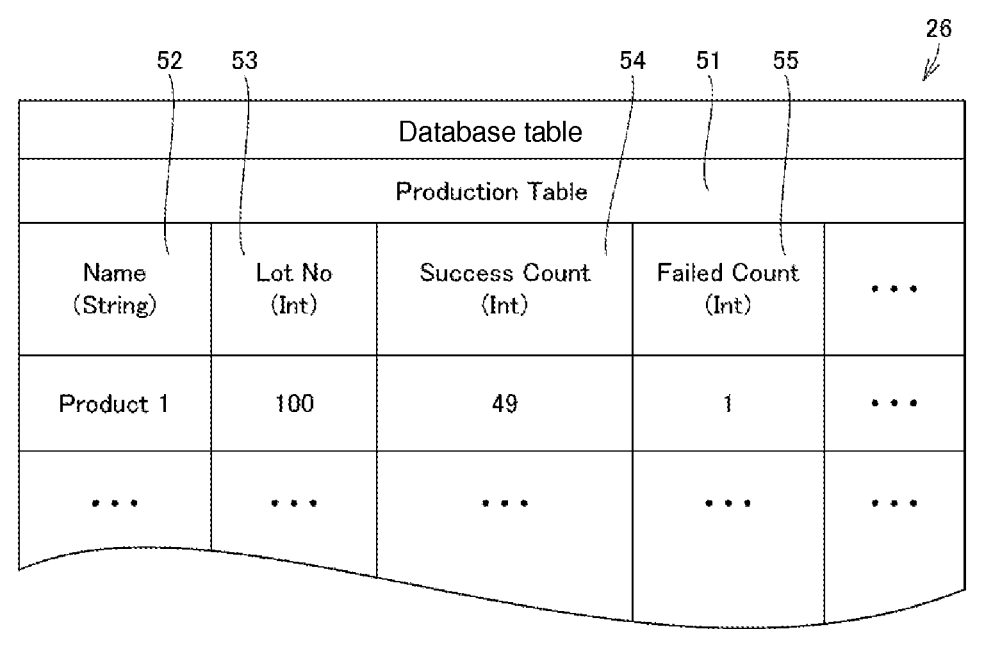

FIG. 5 is a view illustrating one of the database tables 26. These database tables 26 are managed in the DBMS 22 of the DB server 20 as described above.

Each database table 26 includes: a table name 51 that indicates the name of a table and fields of the table (Name 52, Lot No 53, Success Count 54, Failed Count 55 and so on). In the example of FIG. 5, the table name is "Production Table" as indicated as the table name 51, which means that information regarding products is stored in this table. The Name 52 indicates a product name; the Lot No 53 indicates a product lot number. The Success Count 54 indicates the number of products successfully manufactured; Failed Count 55 indicates the number of products defectively manufactured.

3 Operation

Next, operations of the PC 10 and one of the PLCs 30 in this embodiment will be described in detail with reference to some accompanying drawings.

An outline of an operation in embodiment 1 is as follows.

The user creates the user program in the PC 10 which will be executed in one of the PLCs 30. The user creates the user program including structure types of variables in order to access the DB server 20.

The PLC 30 receives the user program and the definition information 32 from the PC 10 and stores them. The sequence command program 34 sequentially performs instructions in the user program 38 and extracts values of members, which are variables of the structure type, from the memory in accordance with the execution of the instructions in the user program 38. The sequence command program 34 passes a process to the DB access process program 35 in accordance with an instruction of invoking the DB access process program 35. The DB access process program 35 analyzes, for example, the definition indicated by the definition information 32 in the user program 38. Then, the DB access process program 35 generates a SQL statement used to access the DB server 20 by using the data included in the user program 38 and the values of the members, which are variables of the structure type, extracted by the execution of the instruction in the user program 38. The DB access process program 35 transmits the generated SQL statement to the DB server 20, executing the SQL statement (causing the DB server 20 to execute the SQL statement).

In this embodiment, the data type definition unit 14 in the programming tool 12 defines the structure tag name, the member names and the data types of the members such that they are related to the table name and the field names in the database table 26 held in the DB server 20. More specifically, the structure tag name is related to the table name; the member names are related to the respective field names. This definition is included in the definition information 32 in the user program 38. Consequently, the DB access process program 35 can create the SQL statement by using the structure tag name included in the definition information 32 as the table name without any change. This also applies to the member names and the field names. Alternatively, the structure tag name that defines the structure may be related to the table name of the database table 26.

Figure 6:
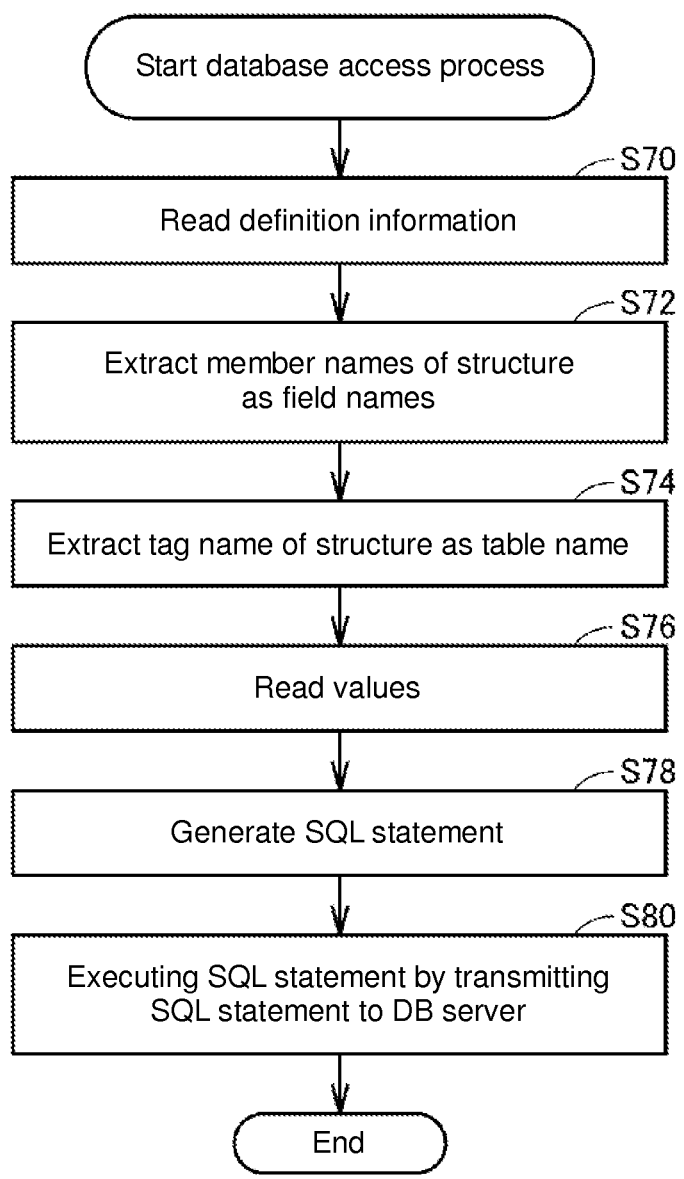
FIG. 6 is a flowchart of a process through which a DB access process program 35 creates and executes a SQL statement.

FIG. 6 is a flowchart of a process through which the DB access process program 35 creates and executes the SQL statement.

At Step S70, the DB access process program 35 reads the definition information 32.

At Step S72, the DB access process program 35 refers to the definition of the structure which is indicated by the definition information 32, and extracts the member names. Then, the DB access process program 35 sets the extracted member names as the field names to be used to operate the DB 24.

At Step S74, the DB access process program 35 extracts the structure tag name from the definition of the structure which is indicated by the definition information 32, and then sets the extracted structure tag name as the table name used to operate the DB 24.

At Step S76, the DB access process program 35 reads the values of the members in the structure which have been extracted by the execution of the user program 38.

At Step S78, the DB access process program 35 relates the field names acquired at Step S72 to the corresponding values read at Step S76 and creates a SQL statement by using the table name obtained at Step S74.

At Step S80, the DB access process program 35 transmits the generated SQL statement to the DB server 20, operating the DB 24 in the DB server 20.

The foregoing process enables a user responsible for creating a user program for controlling PLCs 30 to access a DBMS 22 without describing a SQL statement used to operate a database. For example, even if a user is not familiar with database operations, he or she can create a user program that accesses a database without the need to learn, for example, the concept of a SQL used to operate databases.

A specific, exemplary user program and SQL statement will be described below.

An exemplary user program created by the programming tool 12 will be described. FIG. 7 is a view showing an exemplary user program.

A user creates a program, such as a user program 71 shown in FIG. 7, by using a structure type of data structure. In the exemplary user program 71, the variable name of the structure type of variable is "ProductionTable." When the user program 71 in FIG. 7 is executed, the values of the members are extracted. For example, the DB access process program 35 extracts "Product1," "100," "49" and "1" from the memory in one of the PLCs 30 as the values of the members "Name," "LotNo," "SuccessCount" and "FailedCount," respectively. Then, the DB access process program 35 creates a SQL statement as shown in FIG. 8, and the PLC 30 transmits it to the DB server 20. The database is thereby updated.

The "NJtoDBFunc" denotes an instruction used to cause the PLC 30 to invoke a library (a library used to cause the DB access process program 35 to access the DBMS 22) prepared in the sequence command program 34 in advance and to access the DBMS 22 by using the DB access process program 35. The "DBHandle" denotes a handle used to connect the PLC 30 to the DBMS 22. The handle is set at the beginning of a process in which the user program 38 establishes a connection to the DBMS 22. The "Variable" denotes the variable name ("ProductionTable" in the example of FIG. 7) of a structure type of variable that is a target for a value that the PLC 30 passes to the DB server 20. The "Done" and "Error" are output instructions and show a status where the instruction has been completed.

A specific, exemplary SQL statement generated at Step S78 will be described. FIG. 8 is a view showing an exemplary SQL statement. FIG. 8 corresponds to the user program 71 in FIG. 7.

It should be noted that at Steps S72 and S74, the table name and the field names are extracted from an access target for the PLC 30, which is one of the database tables 26 held in the DB server 20. At Step S76, the DB access process program 35 analyzes words of instructions in the user program 71 and reads database values from the memory. As indicated by the SQL statement 81 in FIG. 8, the DB access process program 35 generates a SQL statement used to update the values of fields in the table name "ProductionTable."

The example of FIG. 8 shows a case where data is added to a database. However, a SQL statement may be used to write data into a database, read data from a database, or create a database itself. The DB access process program 35 generates such a SQL statement and transmits it to the DB server 20, operating the database. Insert, Select and other languages that operate data and DML (data manipulation language), DDL (data definition language) and the like can be used as examples of a SQL statement.

4 Modification

Modification 1 of Example 1

According to the above description of example 1, the DB access process program 35 sets the tag name of a structure which is included in the definition information 32, as a table name used to access the DBMS 22 without any change. Likewise, the DB access process program 35 sets member names included in the definition information 32 as field names without any change.

Alternatively, in accordance with a preset conversion rule, the DB access process program 35 may convert the structure tag name and member names included in the definition information 32 into a table name and a field name used to access the DBMS 22. Herein, the preset conversion rule is a rule used to, for example, convert the structure tag name and member names of a structure into respective character strings that enable the access to the DBMS 22. For example, (i) the character string of each of the structure tag name and the member names is partially removed so that they are set as a table name and field names, respectively. (ii) If at least one of the structure tag name and the member names in the definition information 32 includes a character string prohibited from being used as a table name and field names in the DBMS 22, this character string is removed or modified, and they are used as the table name and the like.

Modification 2 of Example 1

According to the above description of example 1, the DB access process program 35 generates a SQL statement including values, as shown in FIG. 8, that have been read at Step S76. However, this is not limiting. Alternatively, first the DB access process program 35 may generate a SQL statement including no values and transmits it to the DBMS 22 in advance. Continuing, the DB access process program 35 may transmit the values to the DBMS 22 whenever acquiring values periodically, thereby operating the DBMS 22.

In the example of FIG. 6, for example, the DB access process program 35 determines field names and a table name used to operate the DB 24 through the processes of Steps S70, S72 and S74, and generates a SQL statement including no values by using the determined field name and table name. In the SQL statement including no values, the item "VALUE," as in the example of FIG. 8, is empty (e.g., VALUE (?, ?, ?, ?)). The DB access process program 35 transmits the SQL statement including no values to the DBMS 22 in advance. Continuing, the DB access process program 35 transmits values for the SQL statement to the DBMS 22 on the basis of the process result of the user program 38. In the example of FIGS. 7 and 8, for example, the values "(Product1', 100, 49, 1)" are transmitted from the PLC 30 to the DBMS 22 through the process performed by the DB access process program 35. In this way, a SQL statement including no values and its values are transmitted from a PLC 30 to a DBMS 22 through a process performed by a DB access process program 35. Consequently, the SQL statement is executed.

5 Embodiment 2

Next, another embodiment will be described. According to the description of embodiment 1, on the basis of the user program 38 and the definition information 32, each PLC 30 sets the structure tag name and member names indicated by the definition information 32 as a table name and field names, respectively, without any change. Otherwise, on the basis of a preset conversion rule, each PLC 30 converts the structure tag name and the member names into a table name and field name, respectively.

In contrast, in embodiment 2, each PLC 30 holds mapping information 41; the mapping information 41 indicates a conversion rule for converting the structure tag name and member names indicated by definition information 32 into a table name and field names, respectively, used to allow a DB access process program 35 to access a DBMS 22. The DB access process program 35 generates a SQL statement on the basis of the mapping information 41 corresponding to the structure tag name.

Figure 9:
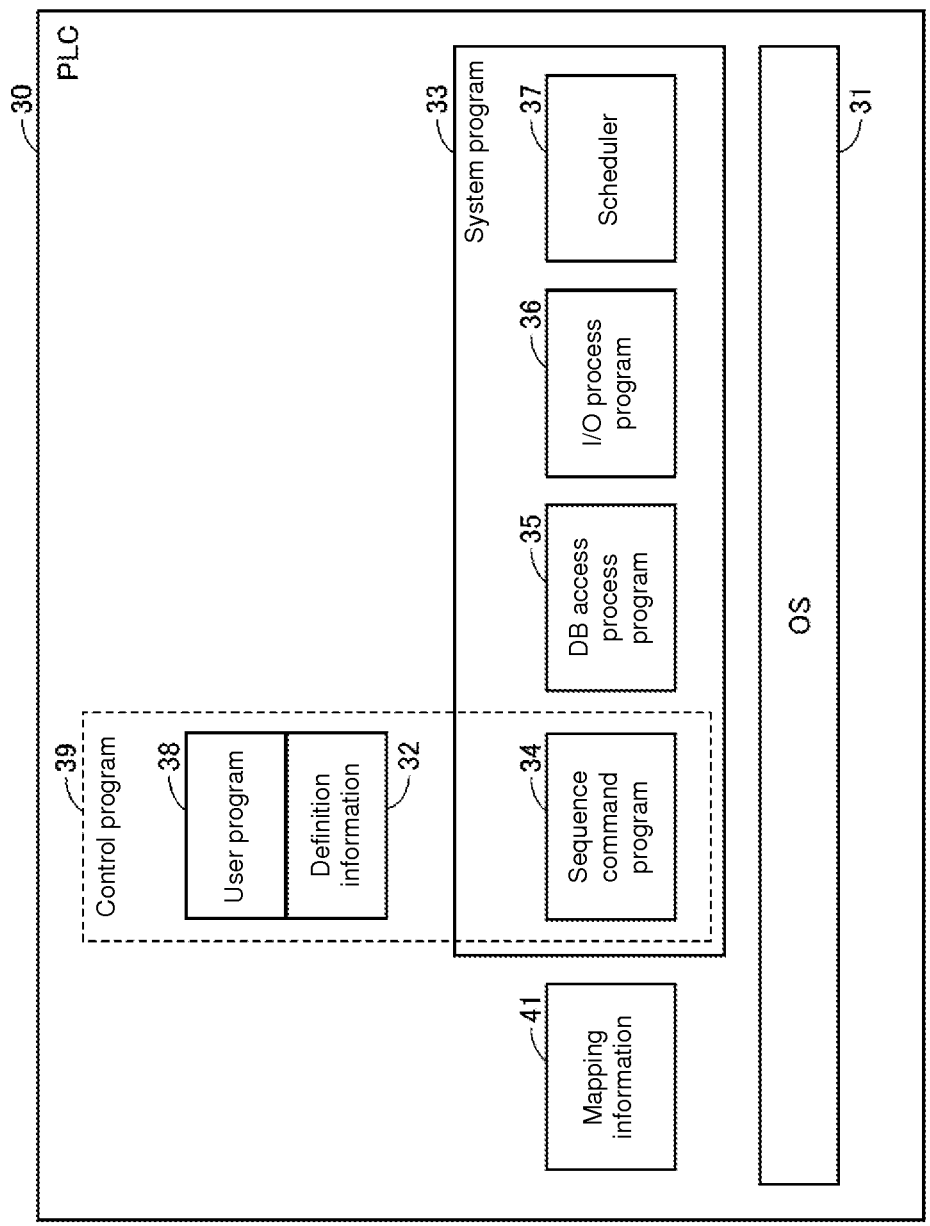
FIG. 9 is a functional block diagram of a configuration of a PLC 30 in embodiment 2.

A specific description will be given below. FIG. 9 is a functional block diagram of a configuration of each PLC 30 in embodiment 2. A difference from embodiment 1 is that each PLC 30 holds the mapping information 41.

Figures 10, 11:
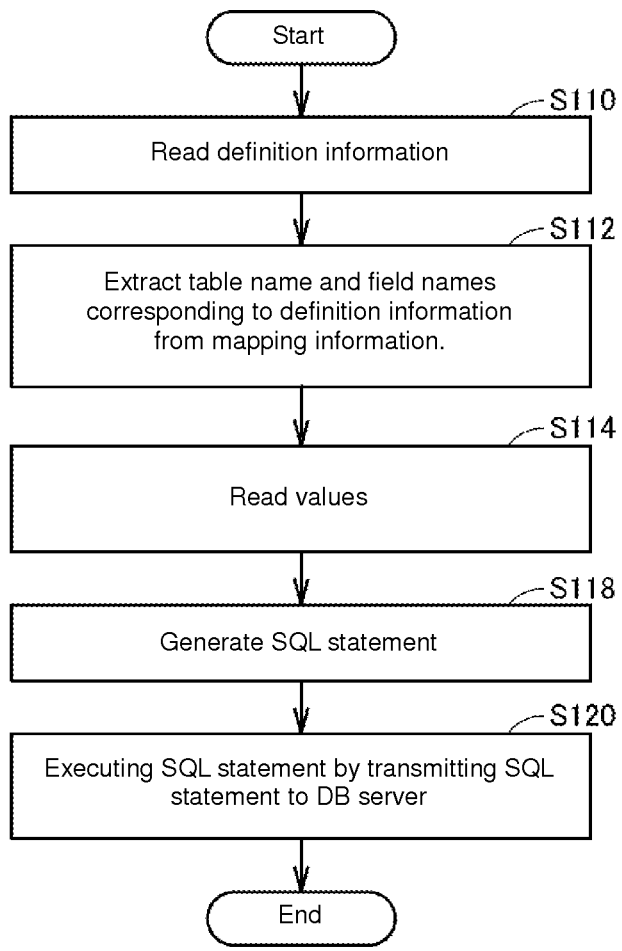
FIG. 10 is a view showing exemplary mapping information 41.
FIG. 11 is a flowchart of an operation of a DB access process program 35 in embodiment 2.

FIG. 10 is a view showing exemplary mapping information 41. As illustrated in FIG. 10, the mapping information 41 relates a structure tag name to a table name used to access the DBMS 22. Likewise, the mapping information 41 relates member names of a structure to respective field names.

The mapping information 41 may be created by, for example, the administrator of the DB server 20 and held in each PLC 30 in advance. Alternatively, table information and field information in a database table 26 may be acquired by the PC 10. In addition, a conversion rule for converting a structure tag name and member names defined in a data type definition unit 14 into the table information and field information may be created in the PC 10 by the administrator.

6 Operation of Embodiment 2

FIG. 11 is a flowchart of an operation of the DB access process program 35 in embodiment 2.

Similar to embodiment 1, one of the PLCs 30 receives a user program and the definition information 32 from the PC 10 and stores them. A sequence command program 34 sequentially executes instructions in the user program 38 and extracts values of members, which are variables of the structure type, in association with the execution of the user program 38. The sequence command program 34 passes a process to the DB access process program 35 in accordance with an instruction of invoking the DB access process program 35.

A specific description will be given below.

At Step S110, the DB access process program 35 reads the definition information 32 from a user program 38.

At Step S112, the DB access process program 35 reads a table name and field names corresponding to the structure tag name and members in the definition information 32 from the mapping information 41.

At Step S114, the DB access process program 35 reads the values of the members of the structure which are extracted by the execution of the user program 38.

At Step S118, the DB access process program 35 generates a SQL statement used to access the DB server 20 by using the table name and field names that have been read at Step S112 and the values that have been read at Step S114.

At Step S120, the DB access process program 35 transmits the generated SQL statement to the DB server 20, executing the SQL statement.

According to embodiment 2 described above, mapping information 41 indicates a conversion rule for converting definition information 32 into a table name and field names used to access a DBMS 22. For example, even if at least one of a structure tag name and member names includes a character string that cannot be used for a table name and field names, a DB access process program 35 can generate a SQL statement by referring to the mapping information 41.

Even if a user has difficulty in handling a rule for naming a table name and field names in a DBMS 22 (e.g., if a table name includes a character string that a human cannot memorize easily), a DB access process program 35 generates a SQL statement by referring to mapping information 41, thus enabling the user to create a user program 38 by using easily understandable character strings for a structure tag name and member names. This is also effectively applicable to a case where a user would like to set freely a structure tag name and member names. Therefore, the user can develop programs even if the user is not familiar with the concept of a SQL.

According to the above description of embodiment 2, mapping information 41 is created by, for example, the administrator of a DB server 20 and held in each PLC 30 in advance. Alternatively, a user program 38 may include an instruction of causing each PLC 30 to generate mapping information 41. For example, a PC 10 generates a user program 38 that includes a conversion rule for converting the definition of data of a structure (structure tag name, member names, etc.) which is indicated by definition information 32 into a table name and field names used for access by each PLC 30 to a DBMS 22. This user program 38 includes an instruction of causing each PLC 30 to generate the mapping information 41.

In each PLC 30, a sequence command program 34 executes a user program 38 and generates mapping information 41 in accordance with an instruction of generating a conversion rule as described above and the mapping information 41 included in the user program 38. Then, the sequence command program 34 holds the generated mapping information 41 in a memory. A DB access process program 35 refers to the mapping information 41 held in the memory and generates a SQL statement on the basis of structure types of variables included in the user program 38 during a process following the generation of the mapping information 41. Each PLC 30 can thereby perform a process of generating a SQL statement at a high speed.

According to the above description of this embodiment, a PC 10 generates definition information 32 and a user program in accordance with an input operation of the user and transmits the generated definition information 32 and user program to each PLC 30. Alternatively, the user program may include definition information 32. In this case, the PC 10 generates a user program including definition information 32 and then transmits the generated user program to each PLC 30.

In this way, the embodiments have been described; it will be appreciated that these embodiments may be combined with each other. Up to this point, the specific invention conceived of by the inventors has been described on the basis of the embodiments; however the present invention is not limited to these embodiments and it will be appreciated that various modifications are possible without departing from the spirit of the invention.

The disclosed embodiments are considered to be exemplary and not limiting in all respects. The scope of the present invention is not specified by the above description but by the claims, and the meaning of equivalents of the claims and all possible modifications made within the scope of the invention are intended to fall within this scope.

DESCRIPTION OF SYMBOLS

10 PC
12 programming tool
14 data type definition unit 16 programming function
20 DB server
22 DBMS
24 DB
26 database table
30 PLC
31 OS
32 definition information
33 system program
34 sequence command program
35 DB access process program
36 I/O process program
37 scheduler
38 user program
39 control program
40 switching hub
41 mapping information
51 table name
52 Name
53 Lot No
54 Success Count
55 Failed Count
71 user program
81 SQL statement

The invention claimed is:

1. A programmable logic controller (PLC) for accessing a database system, the PLC comprising:
a connection configured to connect the PLC with a personal computer for receiving a user program and definition information from the personal computer, wherein the definition information is in a non-SQL language;
an interface configured to read values from an external sensor;
a microprocessor configured to perform operations based on stored instructions;
a memory configured to store the user program and the definition information, the user program including a variable of a structure type, the definition information indicating a definition of the structure type included in the user program;
a converter configured to convert the definition information in the non-SQL language to a SQL statement for controlling the PLC to access the database system; and
an executioner configured to execute the SQL statement that is generated by transmitting the SQL statement to the database system.

2. The PLC according to claim 1,
wherein the converter converts the definition information in the non-SQL language to the SQL statement by extracting a structure tag name and a member name indicated by a definition in the definition information which corresponds to the user program that is executed and designating the structure tag name and the member name that are executed as a table name and a field name used to access the database system in accordance with a preset conversion rule.

3. PLC according to claim 1,
wherein the converter converts the definition information in the non-SQL language to the SQL statement including no value, from which a table name and a field name used to access the database system are identified, based on the definition information, and
the executioner executes the SQL statement by transmitting the SQL statement including no value to the database system in advance, extracting a value of a member in the variable of a structure type in accordance with an instruction in the user program, and transmitting the value that is extracted to the database system.

4. The PLC according to claim 1,
wherein the memory stores mapping information that provides a conversion rule for converting a definition of a structure tag name and a member name indicated by the definition information into a table name and a field name used to access the database system, and
the converter converts the definition information in the non-SQL language to the SQL statement based on the structure tag name and the member name indicated by the definition information and the conversion rule provided by the mapping information.

5. The PLC according to claim 4,
wherein the converter converts the definition information in the non-SQL language to the SQL statement including no value based on a table name and a field name indicated by the mapping information, and
the executioner executes the SQL statement by transmitting the SQL statement including no value to the database system in advance, extracting a value of a member in the variable of a structure type in accordance with an instruction in the user program, and transmitting the extracted value to the database system.

6. The PLC according to claim 1,
wherein the memory is configured to store mapping information that provides a conversion rule for converting a definition of a structure tag name and a member name indicated by the definition information into a table name and a field name used to access the database system,
the user program includes an instruction for generating the mapping information based on the definition information, and
the converter converts the definition information in the non-SQL language to the mapping information based on the definition information by executing the instruction for generating the mapping information which is included in the user program, and
converts the definition information in the non-SQL language to the SQL statement based on the structure tag name and the member name indicated by the definition information and the conversion rule provided by the generated mapping information.

7. A programmable logic controller (PLC) for accessing a database system, the PLC comprising:
a connection configured to connect the PLC with a personal computer for receiving a user program and definition information from the personal computer, wherein the definition information is in a non-SQL language;
an interface configured to read values from an external sensor;
a microprocessor;
a memory configured to store the user program and the definition information, the user program including variable of a structure type, the definition information indicating a definition of the structure type included in the user program, the memory including instructions that when executed by the microprocessor, cause the microprocessor to perform operations including
converting the definition information in the non-SQL language to a SQL statement for controlling the PLC to access the database system; and
executing the converted SQL statement by transmitting the SQL statement to the database system.

8. The PLC according to claim 7,
wherein the converting converts the definition information in the non-SQL language to the SQL statement by extracting a structure tag name and a member name indicated by a definition in the definition information which corresponds to the executed user program and designating the extracted structure tag name and member name as a table name and a field name used to access the database system in accordance with a preset conversion rule.

9. The PLC according to claim 7,
wherein the converting converts the definition information in the non-SQL language to the SQL statement including no value, from which a table name and a field name used to access the database system are identified, based on the definition information, and
the executing executes the SQL statement by transmitting the SQL statement including no value to the database system in advance, extracting a value of a member in the variable of a structure type in accordance with an instruction in the user program, and transmitting the extracted value to the database system.

10. The PLC according to claim 7,
wherein the memory stores mapping information that provides a conversion rule for converting a definition of a structure tag name and a member name indicated by the definition information into a table name and a field name used to access the database system, and
the converting converts the definition information in the non-SQL language to the SQL statement based on the structure tag name and the member name indicated by the definition information and the conversion rule provided by the mapping information.

11. The PLC according to claim 10,
wherein the converter converts the definition information in the non-SQL language to the SQL statement including no value based on a table name and a field name indicated by the mapping information, and
the executing executes the SQL statement by transmitting the SQL statement including no value to the database system in advance, extracting a value of a member in the variable of a structure type in accordance with an instruction in the user program, and transmitting the extracted value to the database system.

12. The PLC according to claim 7,
wherein the memory is configured to store mapping information that provides a conversion rule for converting a definition of a structure tag name and a member name indicated by the definition information into a table name and a field name used to access the database system,
the user program includes an instruction for generating the mapping information based on the definition information, and
the converting converts the definition information in the non-SQL language to the mapping information based on the definition information by executing the instruction for generating the mapping information which is included in the user program, and converts the definition information in the non-SQL language to the SQL statement based on the structure tag name and the member name indicated by the definition information and the conversion rule provided by the generated mapping information.

* * * * *